(12) United States Patent
Birth

(10) Patent No.: US 8,279,970 B2
(45) Date of Patent: Oct. 2, 2012

(54) TRANSMISSION SPECTRA

(75) Inventor: Winfrid Birth, Veitsbronn (DE)

(73) Assignee: ST-Ericsson SA, Plan-les-Ouates (CH)

( * ) Notice: Subject to any disclaimer, the term of this patent is extended or adjusted under 35 U.S.C. 154(b) by 671 days.

(21) Appl. No.: 12/097,100

(22) PCT Filed: Dec. 12, 2006

(86) PCT No.: PCT/IB2006/054761
§ 371 (c)(1),
(2), (4) Date: Oct. 29, 2008

(87) PCT Pub. No.: WO2007/069192
PCT Pub. Date: Jun. 21, 2007

(65) Prior Publication Data
US 2009/0168921 A1 Jul. 2, 2009

(30) Foreign Application Priority Data
Dec. 13, 2005 (EP) .................................. 05112008

(51) Int. Cl.
*H04L 25/03* (2006.01)
(52) U.S. Cl. ..................... 375/296; 375/305; 455/114.2
(58) Field of Classification Search .................. 375/295, 375/305, 296; 455/114.2
See application file for complete search history.

(56) References Cited

U.S. PATENT DOCUMENTS

| | | | |
|---|---|---|---|
| 5,633,893 A | 5/1997 | Lampe et al. | |
| 5,867,537 A | 2/1999 | Dent | |
| 6,166,601 A * | 12/2000 | Shalom et al. | 330/151 |
| 2003/0012289 A1 | 1/2003 | Lindoff | |
| 2003/0081689 A1 * | 5/2003 | Saito | 375/260 |
| 2005/0220219 A1 * | 10/2005 | Jensen | 375/302 |

OTHER PUBLICATIONS

Harris, Fred "Implementing Waveform Shaping Filters to Pre-Equalize Gain and Phase Distortion of the Analog Signal Processing Path in DSP Based Modems" IEEE Military Communications Conference, 1994. Milcom '94. Oct. 2, 1994, pp. 633-638.
Yan, H; et al "Improved Modulation Techniques for Wireless Communications: Raised Cosine Filtered FQPSK-FQPSK (RC)" IEEE Transactions on Broadcasting, vol. 43, No. 2, Jun. 1997, pp. 221-226.
Jung, Peter "Laurent's Representation of Binary Digital Continuous Phase Modulated Signals With Modulation Index 1/2 Revisited" IEEE Transactions on Communications, vol. 42, No. 2-4, Feb. 1994, pp. 221-224.

* cited by examiner

*Primary Examiner* — Shuwang Liu
*Assistant Examiner* — David Huang
(74) *Attorney, Agent, or Firm* — Potomac Patent Group PLLC

(57) ABSTRACT

Transmitter devices and transmission methods transmit a modulated GMSK- or EDGE-signal in a transmission system, wherein normally the pulse shaping follows the given rules of standards for these mobile radio systems. The amount of TX spectra in the adjacent TX channels is predetermined by these rules. A second filtering step is suggested to be introduced for attenuating predetermined unwanted spectra in the adjacent transmit channels. A second goal of this suggestion is to reduce spectra at adjacent TX channels also at cases of nonlinearity at the TX Power Amplifier of the RF transmitter. Nothing must be changed in standards of mobile communication systems, for example GSM.

18 Claims, 7 Drawing Sheets

| Case= | 0 | 1 | Difference Case 0 to 1 | 2 | Difference Case 0 to 2 | Units |
|---|---|---|---|---|---|---|
| A_State | no AM | no Am | | lin AM | | — |
| Parasitic AM | 0.00 | 0.00 | 0 | 0.22 | 0.22 | dB |
| rms_rhase_error | 0.00 | 1.71 | 1.71 | 1.72 | 1.72 | degree |
| +/−67.7kHz | −3.91 | −3.91 | 0 | −4.46 | −0.55 | dB |
| +/−135.4kHz | −16.74 | −18.04 | −1.3 | −18.58 | −1.84 | dB |
| +/−203.1kHz | −37.85 | −38.30 | −0.45 | −42.68 | −4.83 | dB |
| +/−270.8kHz | −45.69 | −49.76 | −4.07 | −56.30 | −10.61 | dB |
| +/−338.5kHz | −63.01 | −68.73 | −5.72 | −88.29 | −25.28 | dB |
| +/−400kHz | −72.3 | −78.1 | −5.8 | −80.5 | −8.2 | dB |

FIG. 5

TRANSMISSION SPECTRA

BACKGROUND

1. Technical Field

The present invention relates to methods and transmitter devices for transmitting a modulated signal in a transmission system. In particular, the present invention relates to improvements for transmission spectra of shift keying signals, such as Gaussian Minimum Shift Keying (GMSK) or Enhanced Data rates for GSM Evolution (EDGE) signals.

2. Description of the Related Art

The GSM mobile communication standard is now in place throughout most areas of the world. Developed in mid-1980, it is a mature communication technology and provides reliable service. GSM systems operate using a Gaussian Minimum Shift Keying (GMSK) modulation scheme that has a constant envelope and no AM (Amplitude Modulation). Despite of new 3G ($3^{rd}$ Generation) wireless developments, efforts have still been employed to bring data capabilities to existing wireless handset and base station designs. This move-forward mentality sparked the development of so-called 2.5G technologies that would allow wireless operators to deliver voice and higher-speed data services (up to 384 Kbps) without having to rip out the entire infrastructure.

In order to provide more bandwidth-efficient signals for high data rate applications, the EDGE signaling format has been developed as an upgrade for current GSM architectures.

The EDGE format has strong AM. Complex Dirac impulses that are organized as an 8-ary MPSK (M-ary Phase Shift Keying) may occur at the input of the required pulse shaping filter. EDGE can be implemented as a linear in-phase (I) and quadrature-phase (Q) modulation. I and Q are Cartesian components of a complex modulation signal. The EDGE signaling format was designed so that spectral and other characteristics would be compatible with and suitable for overlaying on existing GSM and TDMA (Time Division Multiple Access) systems employing GMSK. Whereas the I- and Q-modulation in EDGE is a linear function of the input coefficients, the continuous phase modulation (CPM) of GMSK has a nonlinear response at I and Q. Different types of precoding and interleaving of transmitted bits are implemented in GSM and EDGE systems. The EDGE signal is constructed by mapping incoming bits into 8-ary exciting Dirac impulses, which correspond to points in an ordinary 8-level phase-shift keying (8PSK) signal constellation. Cartesian components of these signal points are taken as I&Q signals, which are input to the pulse shaping filter and corresponding rails in an I&Q Quadrature Modulator. Or the instantaneous Modulation-Frequency and Modulation-Amplitude is derived from it for a polar modulation in a Polar Modulator instead.

An additional step in the EDGE modulation is a rotation of $3/8 p$ for succeeding symbols. Transitions between symbols occur gradually in EDGE and GMSK signals, producing a compact spectrum. The spectral characteristics of the modulation schemes used in both systems are very similar. But the EDGE signal is not constrained to possess a constant RF amplitude. This signal format places stringent requirements on amplifiers in terms of linearity, contrary to the GMSK signal.

Like the GMSK signal employed in GSM, also the EDGE signal employs a modulating pulse with leading and trailing skirts, which extend into neighboring symbol intervals. Unless special care is taken, this type of pulse can cause successive received symbol statistics to interfere with each other at the receiver output. Such interference causes one symbol to interfere with the voltage level of some of its predecessors and successors. As it was used in older systems with some pulses called Nyquist pulses, it is possible to achieve independence between sampling points at receiver output signals even though the pulse extends for more than one symbol. These pulses allow trailing and leading skirts of successive pulses.

Newer systems than GSM and EDGE use highly complex algorithm in Digital Signal Processors in order to detect the signal.

In addition to the traditional RF approaches, DSP techniques have also emerged as a key method for performing filtering within modern receivers. Multi-path propagation of RF radio signals in a hilly terrain causes long Inter-Symbol-Interference (ISI). The signal processing employed in typical GSM and EDGE receiver designs often includes algorithms that deliver sophisticated equalization and coding schemes. The algorithms employed within these functions can process raw received symbols in an optimum fashion to actually improve end-to-end BER (bit error rate) performance.

The required transmission (Tx) signal for all GSM systems as GSM900, DCS1800, PCS1900 and US850 is 0.3GMSK, as specified in the specification for GSM/EDGE: 3GPP TS 45.005 V7.0.0 (2005-04). According to these recommendations, errors at the phase of GMSK must be below 20° peak and below 5° rms. There is no amplitude modulation (AM) at the Tx signal in order to keep the required Power Amplifier (PA) simple. The GMSK Tx spectrum is rather wide due to this rule. However, a receiver uses the spectrum only within a range of about +/−110 kHz.

Additionally, Tx signals for the 8PSK-system EDGE are also defined in the above recommendations. Test limits are defined at the Error Vector Magnitude (EVM). An average EVM should remain below 9% and peak errors below 30%. There are specified templates for the required limits of Tx spectra. The limit for 400 kHz separation is −60 dB for GSM and −56 dB for EDGE. These locations in the templates are named 400 kHz corners.

In both GMSK and EDGE cases, there is a little degree of freedom for system improvements. It is however not intended to create new standards for Tx error rules or the like.

Peter Jung, "Laurent's Representation of Binary Digital Continuous Phase Modulated Signals with Modulation Index 1/2 Revisited", IEEE Transactions on Communications (ISSN 0090-6778), vol. 42, no. 2-4, pt. 1, p. 221-224, 02/1994, discloses that composition of GMSK signals is possible by nonlinear superposition of signals in a QAM system (Quadrature Amplitude Modulation). One of these pulse shaping functions is named C0. The same C0 is used in the specified standard for EDGE transmit modulation.

BRIEF SUMMARY

It is an object of the present invention to provide a transmission method and transmitter device, by means of which, in terms of quality of the spectrum, more robustness against non-linearity of transmitter output stages can be achieved for EDGE, and which can also improve the spectrum of GMSK in spite of AM cancellation at the RF output stage for GSM.

Accordingly, the base-band signals I and Q, e.g. of an GMSK/EDGE transmitter, are filtered by the additional circuit elements in a special manner in order to improve the margins at the Tx spectrum. In particular, filtering is done in such a manner that the spectrum is still improved after subsequent amplitude compression effects, e.g. AM cancellation in case of GMSK signals or certain AM compression in case of EDGE signals. The amplifier means, e.g. Tx Power Amplifier (PA), transmits a more frequency selective Tx signal as long as the PA operates linearly. An AM-compressing PA still creates a spectrum that is improved due to the introduced second filter means or step.

The radio system may be an EDGE system or a GMSK system. Furthermore, a suboptimal final transmission stage (60) may be provided. Thereby, manufacturing costs can be reduced substantially. The circuit elements serve to relax the requirements of compensation of non-linear effects.

The transmitter device may comprise pre-compensation means for only partially compensating non-linear effects of the final transmission stage.

Further, additional circuit elements may be used for transmission via another radio system and arranged for low-pass filtering Cartesian components of a modulation pointer of a radio signal of the other radio system to improve the transmission spectrum of a final transmission stage even if the final transmission stage deletes all amplitude modulations. As an example, the other radio system may be a GMSK system. This combined provision of circuit elements for different radio leads to a high degree of spectral purity of transmission signals.

The circuit element may comprises filter means with a predetermined number of filter coefficients comprising data for a discrete convolution in the time domain. The discrete convolution operation is used for pulse shaping and replaces provision of a fundamental pulse. Additionally, filter means may comprise a finite impulse response (FIR) filter arranged in an in-phase path and a quadrature-phase path and having filter parameters and a predetermined sampling time Ts which is smaller than a step period T of primary transmission symbols. In this case, odd-numbered filter parameters are set to the value "1" and even-numbered filter parameters are set to the value "−1", wherein said sampling time Ts is set to one twelfth of said step period T, and wherein said step period is set to 48/(13 MHz). This example provides the advantage of being very simple to implement.

Additionally, the filter means may be arranged to pre-compensate analog filters connected behind a subsequent digital-to-analog converter by inverse convolution.

The transmitter device may comprise a polar modulator and the circuit element may be arranged in an amplitude processing path and a phase processing path of the polar modulator.

Furthermore, the filter coefficients of the filter means may be variable to enable adjustment of a notch frequency of the filter means. The notch frequency can thus be adjusted to special noise frequencies which may be higher order waves of other frequencies in the system, such as crystal frequencies. This adjustability may save development costs for a highly integrated device and may reduce development times.

In the following, the expression "Second Filter" is introduced for the circuit elements that change a little the specified modulation for concerned radio systems, such as GMSK and for EDGE.

The modulated signal, represented by I and Q, is generated in a modulator for GMSK or in a modulator for EDGE. By designing the Second Filter means or step in such a manner that the margin at the specific 400 kHz corner of the EDGE or GMSK spectrum is increased, robustness against AM compression can be enhanced.

As a specific example for advanced processing of I and Q signals, the Second Filter means may comprises in-phase filter means at the signal path for I and Q for filtering predetermined edge portions of an in-phase component of the modulation signal and quadrature-phase filter means for attenuating predetermined edge portions of a quadrature-phase component of the modulation signal I and Q. As an alternative for EDGE-only, the Second Filter means may be included in the pulse shaping filter that is used for generating the base-band pulse sequence of sampling points for I and Q. Then, the proposed filtering can be performed before splitting the base-band signal into I and Q components, so that one filter means or step can be saved.

Furthermore, the Second Filter means may comprise a non-recursive digital filter, e.g., one which is based on five filter coefficients K1 to K5. The filter characteristic of the Second Filter means may comprise a notch portion with a predetermined notch frequency.

Further advantageous developments or modifications are defined in the dependent claims.

BRIEF DESCRIPTION OF THE SEVERAL VIEWS OF THE DRAWINGS

The present invention will now be described based on preferred embodiments with reference to the accompanying drawings, in which:

FIG. 5 shows a table with parameters of a GMSK spectrum obtained by the first preferred embodiment for different cases;

DETAILED DESCRIPTION

The preferred embodiments will now be described in connection with a transmitter device according to the first preferred embodiment for transmitting GMSK signals, and a transmitter device according to the second preferred embodiment for transmitting EDGE signals.

In order to improve frequency exploitation in different GSM systems, while preventing changes of the specified existing standards, the idea is to transmit a more frequency selective Tx signal as long as the power amplifier PA operates linearly. With rising power the signal may be AM-compressed without any violation of spectral requirements. Thus, also a conservative PA for GMSK-only is able to transmit improved spectra. Such an improved Tx signal must be generated in a very special manner.

However, in many cases of filtering Cartesian components I and Q of a base-band signal, the Tx RMS (Root Mean Square) phase error increases and the RF spectrum is bad in case of cancelled AM.

There is a predetermined frequency characteristic of the transmission system, i.e. a specified template indicating required limits of GMSK Tx spectra, as can be gathered from the above specification TS 45.005 V7.0.0 (2005-04). A critical limit is the 400 kHz corner in this template. The limit for 400 kHz separation is set to −60 dB. However, often, after AM cancellation by the PA, this corner is violated if the signal is not generated in the best manner.

According to the preferred embodiments, it is suggested to introduce an improving filter circuit, step or characteristic, which is also helpful at error cases of the Tx modulation. It may be adapted to improve the margin at 400 kHz. This improves the production yield and transmitter devices for 0.3-GMSK signals, as it is used for the denoted systems that follow the GSM standard at different frequency bands.

Figure 1:
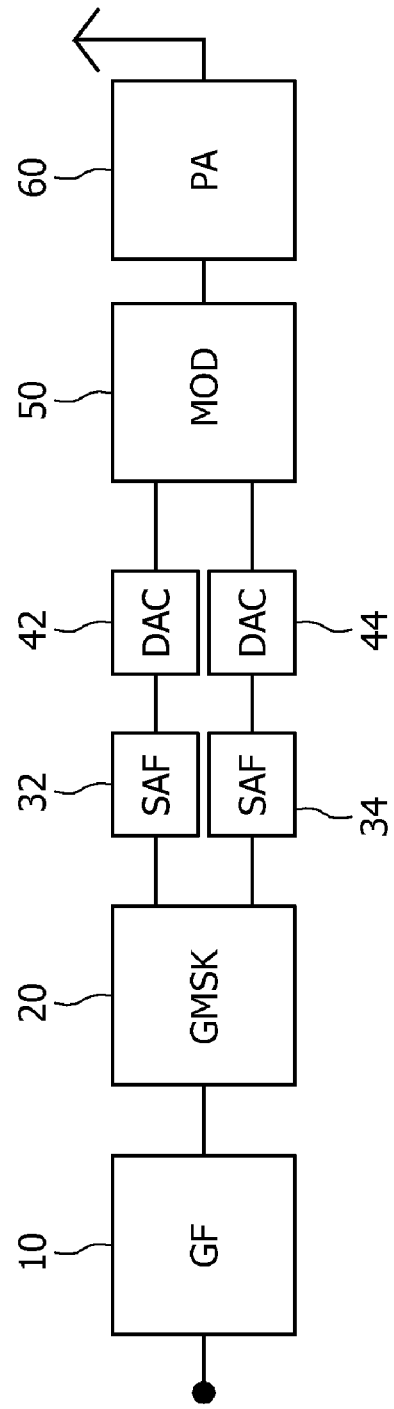
FIG. 1 shows a schematic block diagram of a GMSK transmitter device according to a first preferred embodiment.

FIG. 1 shows a schematic block diagram of a GMSK transmitter device according to the first preferred embodiment. It is to be noted that this block diagrams has been restricted to those blocks which are helpful to understand the present invention. Of course, other units and functions may be included in such a transmitter device.

A digital circuitry comprising a Gaussian low pass filter 10 and a subsequent GMSK circuit provides a GMSK transmitter signal in a known manner, following the rules of the GSM recommendations. The amplitude of the transmit signal is not modulated but the phase. This phase has linear Inter-Symbol-Interference due to the Gaussian filter curve that is defined in the GSM recommendations. The signal is presented by digital words for a number of sample points.

The Gaussian low pass filter 10 is named after its frequency characteristic which follows the well-known shape of the Gaussian distribution curve. The length of the modulation pointer presents the amplitude that remains constant for GMSK. Any further low-pass filtering at well-generated Cartesian components causes signal errors that must be rather small for the GSM system.

In the subsequent GMSK circuit 20, digital I and Q components of the complex modulation pointer A=I+j*Q are generated in a known manner and supplied to respective separate branches. Each of these branches includes a spectral filter 32, 34 according to the preferred embodiments followed by a digital-to-analog converter (DAC) 42, 44, where the digital data is converted to respective analog I and Q components. The analog I and Q components are supplied to an I/Q modulator 50, where they are combined to a single modulated RF signal in the analog domain based on a mixing operation with respective phase shifted RF carrier signals. Finally, the modulated RF signal is amplified in a power amplifier (PA) 60 before transmission via an RF antenna. The DACs 42, 44 normally include low-pass filters at the outputs. These low-pass filters may be part of the suggested Second Filters. Doing this, the system time functions of the filters 32, 34 or 72, 74 are pre-compensated by inverse convolution of the suggested filter functions with the system time function of the filters behind the DACs 42, 44.

In the following, the digital spectral filter 32, 34 is described in more detailed based on FIGS. 3(a) and 3(b). The filters 32 and 34 may have identical construction.

Figure 3A:
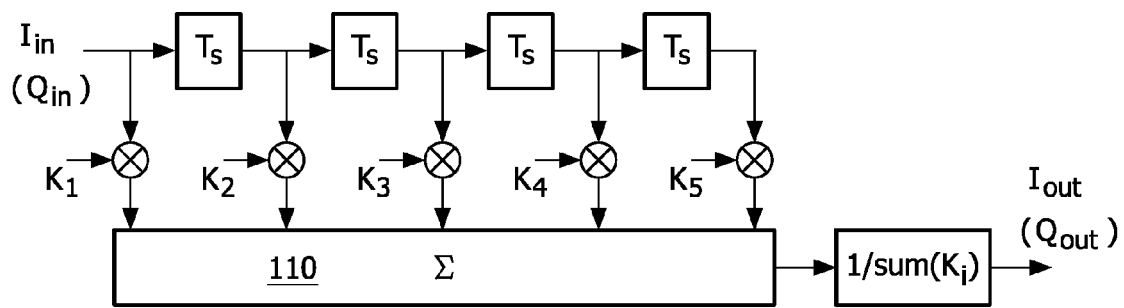
FIG. 3(a) shows a schematic circuit diagram of a non-recursive digital filter which can be employed in the first and second preferred embodiments.

In the first preferred embodiment, the digital filter circuit of FIG. 3(a) is calculated for $T_s=T/n$ with T=48/13 MHz and n=12, wherein T designates the time of a Tx symbol and $T_s$ designates the sampling time. In the present example, the digital filters 32, 34 are implemented as non-recursive or FIR (Finite Impulse Response) filters with five filter coefficients K1 to K5. The transfer function of the spectral filters 32, 34 in the frequency domain can approximately be described by the following function of an analog filter:

$$F(j\omega)=K_1+K_2*e^{\hat{}}(j\omega T_s)+K_3*e^{\hat{}}(j\omega 2T_2)+K_4*e^{\hat{}}(j\omega 3T_s)+K_5*e^{\hat{}}(j\omega 4T_s).$$

Figure 3B:
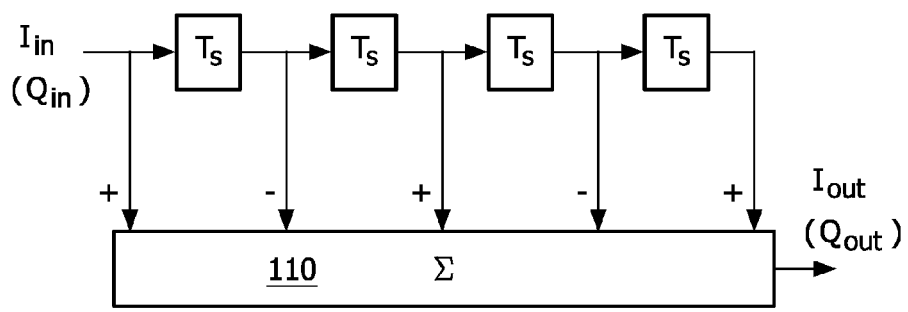
FIG. 3(b) shows a schematic circuit diagram of an implementation example of the non-recursive digital filter of FIG. 3(a)

The digital FIR filter operates a little differently because analog delay blocks are replaced by digital time shifters $T_s$ for sample words in FIGS. 3a and 3b.

FIG. 3(a) shows an architecture of the spectral filters 32, 34 for the respective I and Q components. I.sub.in and Q.sub.in are delayed in time steps $T_s$ and multiplied by the filter coefficients K1 to K5. $I_{out}$ and $Q_{out}$ are generated by an adder function 110 as the sum of the obtained products, divided by the sum of the filter coefficients K1 to K5.

FIG. 3(b) shows an architecture of a specific implementation of the spectral filters 32, 34. This architecture is a simplified version without multipliers for $$K1=K3=K5=+1 \text{ and } K2=K4=-1.$$

Figure 4:
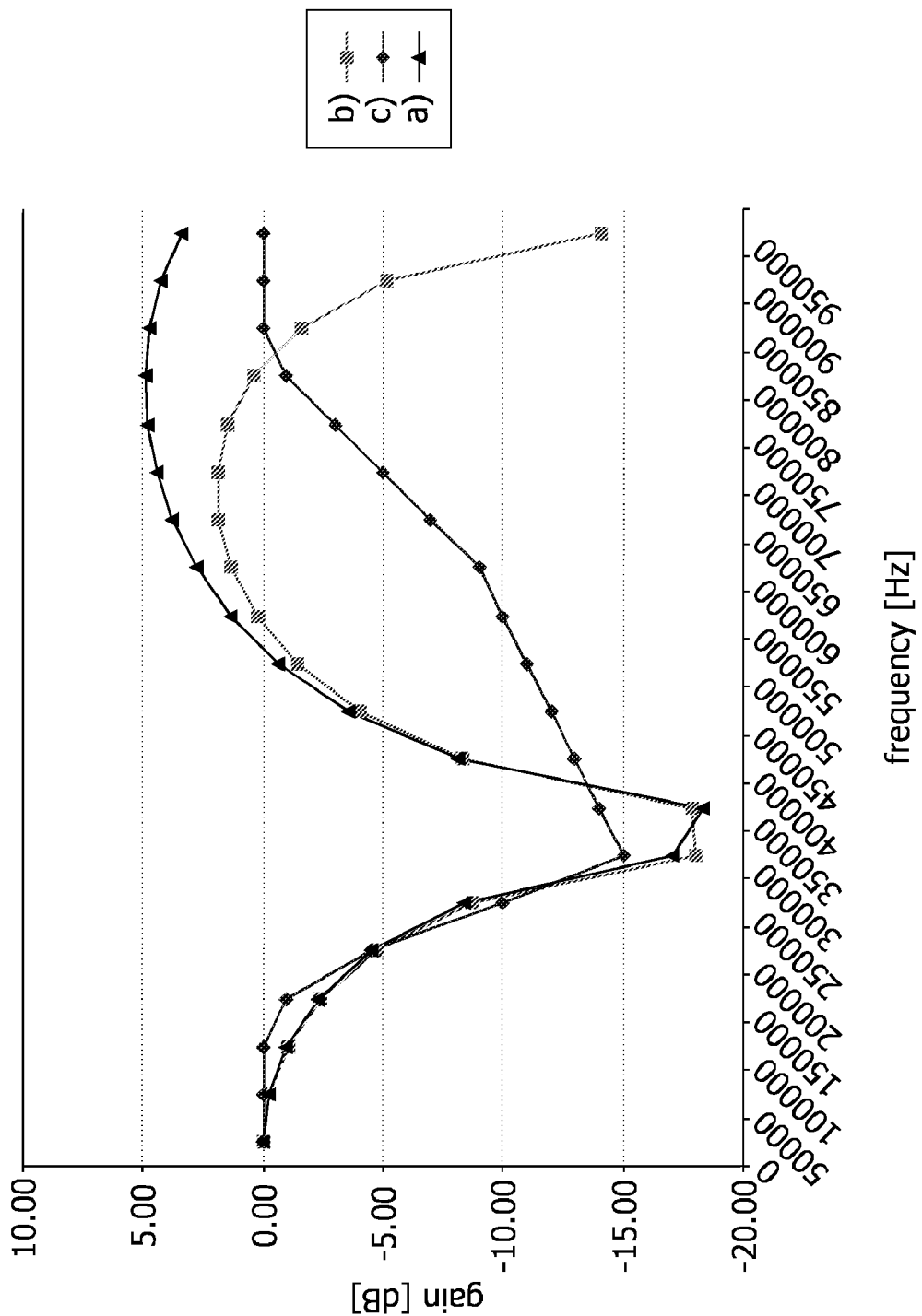
FIG. 4 shows different filter characteristics of the filter circuit of FIG. 3(a)

FIG. 4 shows three filter characteristics in the frequency domain, which can approximately be obtained by the architecture of FIG. 3(a), wherein case (b) relates to the simplified architecture of FIG. 3(b), obtained from a simulation program.

As can be gathered from FIG. 4, the frequency diagram comprises a notch characteristic with a notch frequency which can be trimmed by changing the filter coefficients K1 to K5. Adjustment of a specific notch frequency may be helpful for specific error cases if harmonics or a mix of other frequencies appear that are used in the device.

Now, for long random sequences of transmit symbols, the complex TX signal A=I+j*Q is Fourier transformed. Results are presented in the table in FIG. 5 and in FIG. 6.

FIG. 5 shows a table with parameters of a GMSK spectrum obtained by the first preferred embodiment for different cases. The parameters listed for the first case (0) correspond to an ideal GMSK transmission spectrum as required according to the above mentioned specification 3GPP TS 45.005 V7.0.0 (2005-04). The second case (1) relates to the first preferred embodiment where the I and Q components are filtered by the respective spectral filters 32, 34 and 0.22 dB AM generated by the additional filtering process is cancelled by the PA 60, calculated by A/abs(A). The third case (2) corresponds to the second case (1) with the exception that the 0.22 dB AM is not cancelled.

Figure 6:
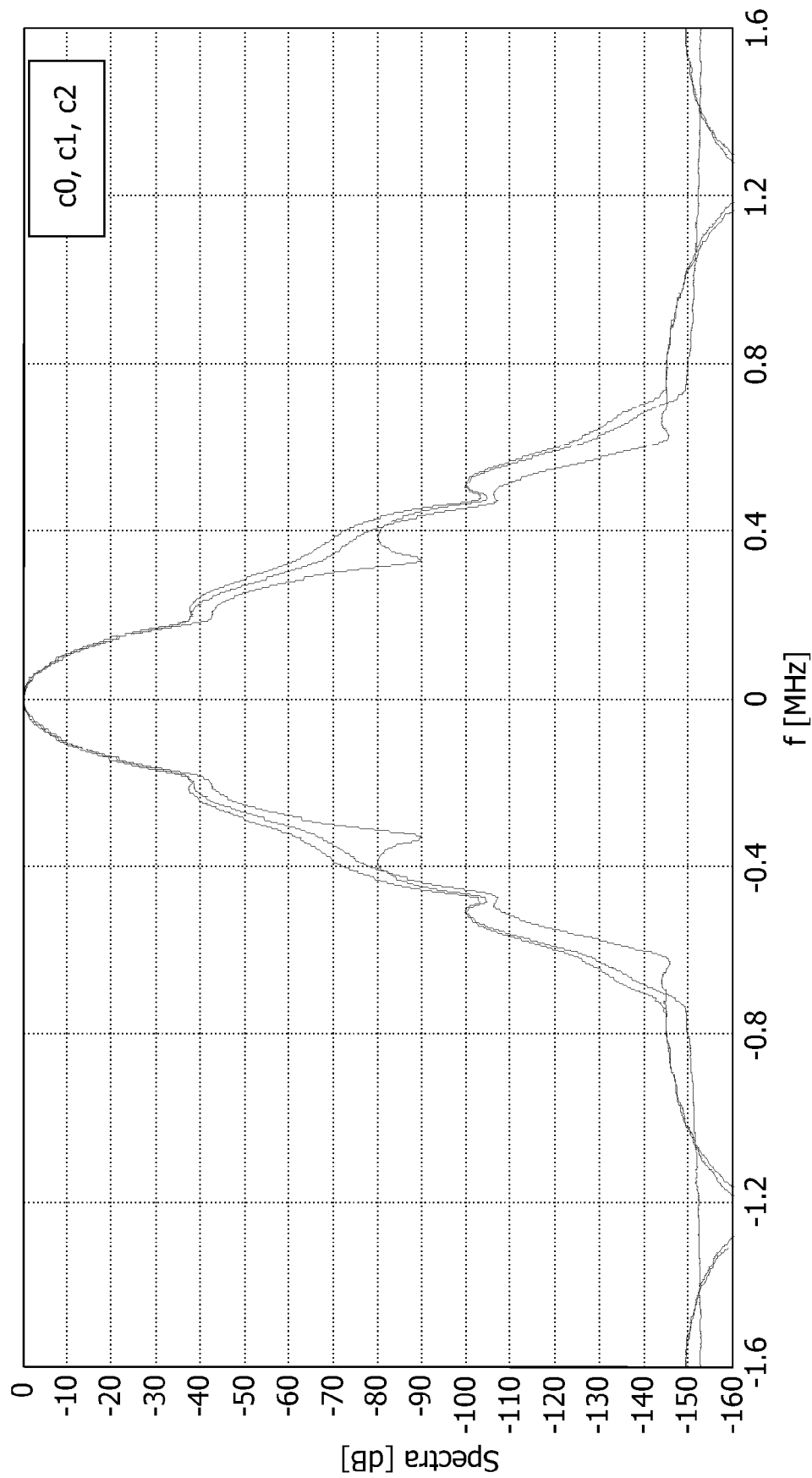
FIG. 6 shows a diagram indicating GMSK transmission spectra of different cases relating to the first preferred embodiment.

FIG. 6 shows a diagram indicating corresponding GMSK transmission spectra of the different cases 0 to 2 of the table of FIG. 5. The upper GMSK spectrum relates to the ideal case 0 and is the widest spectrum, as could be expected when bearing in mind that the proposed additional spectral filters 32, 34 are not included. Furthermore, the improved GMSK spectrum with the medium bandwidth corresponds to case 1, i.e. the case with cancelled AM. Here, a substantial difference of −5.8 dB is obtained at 400 kHz but the rms phase error is 1.7°. Finally, the improved GMSK spectrum with the smallest bandwidth corresponds to case 2 with 0.22 dB AM and shows an even higher difference of −8.2 dB at 400 kHz and also 1.7° rms phase error.

Figure 2:
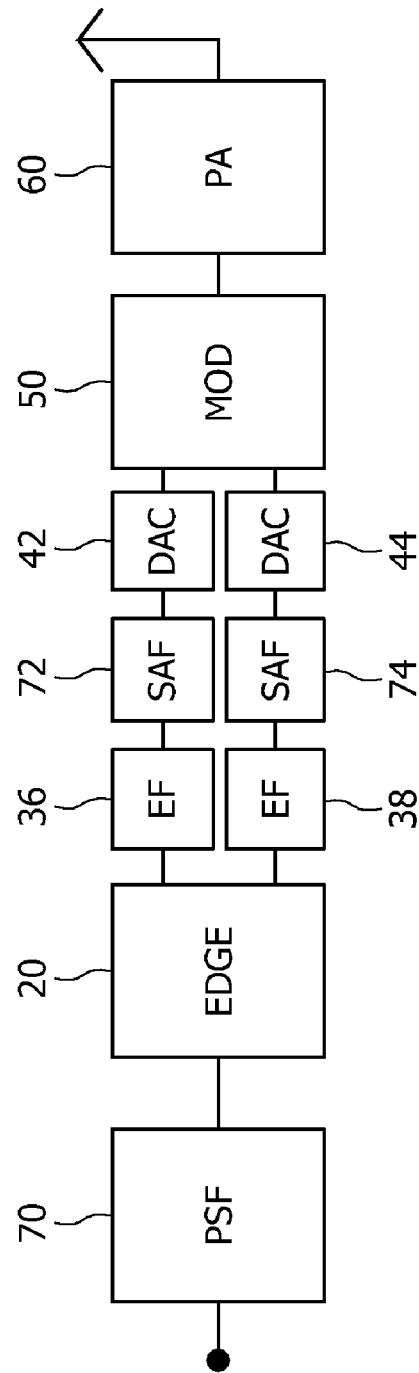
FIG. 2 shows a block diagram of an EDGE transmitter device according to a second preferred embodiment.

FIG. 2 shows a block diagram of an EDGE transmitter device according to the second preferred embodiment.

In the EDGE transmitter device, the base-band I and Q components are generated by an EDGE circuit 20. In the EDGE circuit 20, the EDGE system is specified for the case that I and Q may be filtered in a linear mode by the defined filter with the pulse response C0. EDGE can exactly be described as a linear Quadrature Amplitude Modulation (QAM).

Using this method of modulation, the length of the modulation pointer remains constant only for MSK. A further low-pass filtering of the Cartesian components I and Q by respective EDGE filters 36, 38 causes Amplitude Modulation (AM), visible at the length of the modulation pointer. It is not possible to create the required precise GMSK signal with this method. However, receivers for GMSK are well functional or even better because most of them are designed for Offset-QPSK.

Again, improving new additional spectral filters 72, 74, as for example shown in FIG. 3(a) or 3(b), can be inserted in the paths for the components I and Q in order to improve the system by the suggested additional filters. The added spectral filters 72, 74 violate a little the rule for generating ideal EDGE signals. Nevertheless, this measure improves the EDGE spectra as much as the GMSK spectra. The resulting curve is similar to the lowest curve for the linear case 2 in FIG. 6. A margin of about 25 dB over the required limit value of 56 dB is obtained at the 400 kHz corner.

It is noted that the spectral filters 72, 74 are depicted as dotted boxes in FIG. 2 to express their optional nature. Optionally, in a digital circuitry, all digital filters 36, 38 and the improving filters 72, 74 can be included in block 70 of FIG. 2. This block is defined for a Pulse-Shaping Filter (PSF). The PSF 70 can include the functions of the filters 36, 72 and 38, 74 of the paths for I and Q. A further option concerns FIG. 1 and FIG. 2, where the I&Q Quadrature Modulator 50 can be replaced by a Polar Modulator. For a Polar Modulator, no I and Q is required but the amplitude $A=\text{sqrt}(I^2+Q^2)$ and the modulation frequency which can be expressed as follows:

$$\omega_{mod}(t) = \frac{d}{dt}\varphi(t) = \dot{\varphi} = \frac{I*\dot{Q} - \dot{I}*Q}{I^2 + Q^2} = 2\pi * FM.$$

But, as I and Q are still present in these formulas, all is still valid what is described about filtering in the I&Q paths in FIG. 1 and FIG. 2. The filter of FIGS. 3a and 3b optionally is part of a digital circuitry that provides the function.

The remaining circuit components of the block diagram of FIG. 2 basically correspond to those of FIG. 1 and are not explained again here. But for EDGE the PA 60 normally must operate in a very linear mode.

The AM of the EDGE signal must not be much compressed. An unwanted substantial compression curve is used in the following practical example to demonstrate how an EDGE spectrum can be destroyed if the proposed spectral filters 72, 74 or 70 are not used.

Figure 7:
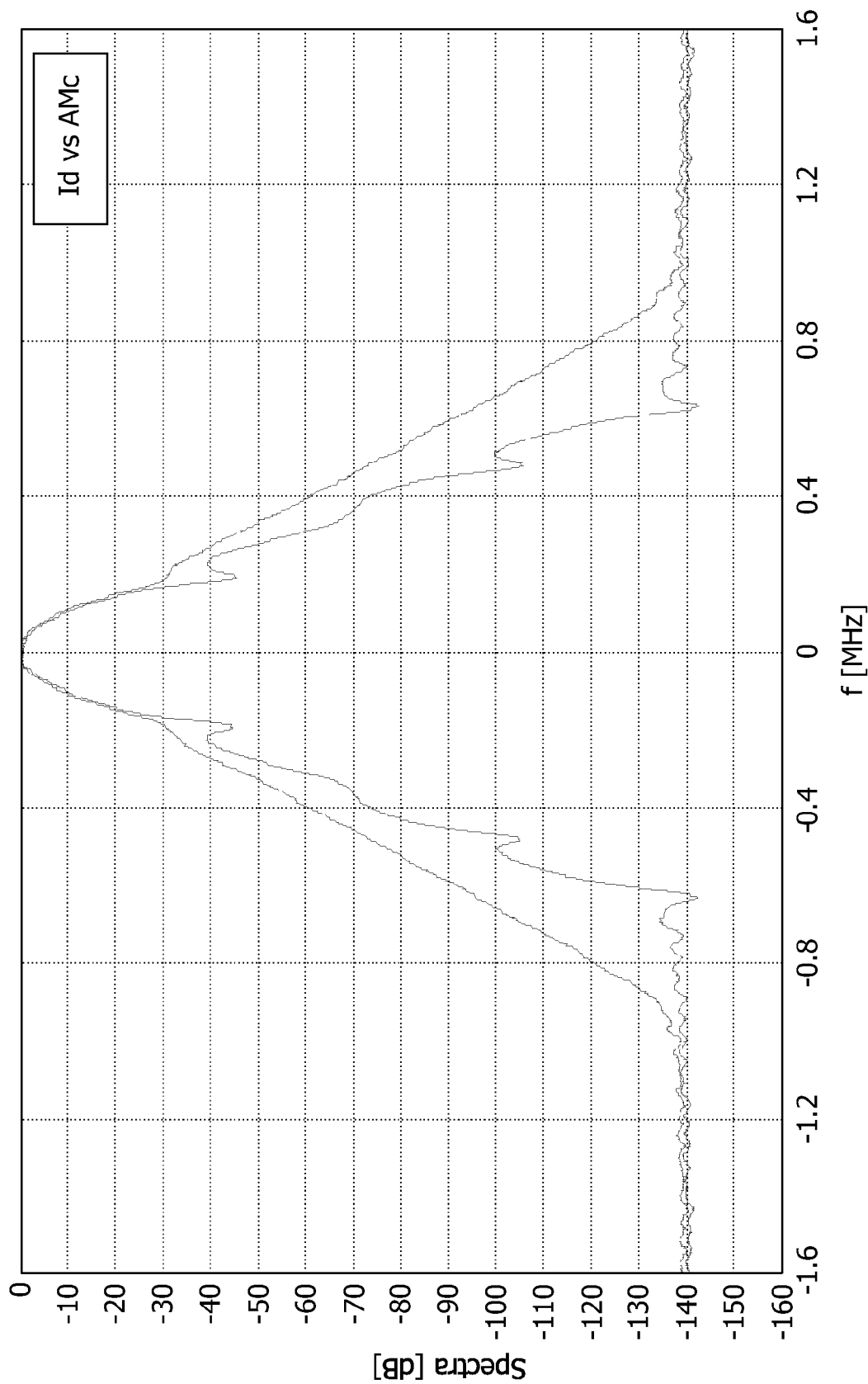
FIG. 7 shows a diagram indicating transmission spectra of different cases relating to a conventional EDGE transmitter.

FIG. 7 shows a diagram indicating transmission spectra of different cases relating to a conventional EDGE transmitter, where the lower curve relates to an ideal EDGE transmission spectrum and the upper curve relates to a transmission spectrum obtained for a chosen compression example where the amplitude x of the EDGE signal is compressed by the function $y=2*\tan h(0.5*x)$. The chosen compression influences the length A of the modulation pointer, which can be expressed as $A=\text{sqrt}(I^2+Q^2)$. The phase of the EDGE signal is not moved by this AM compression.

As shown in FIG. 7, this induced compression leads to an EDGE spectrum which is substantially destroyed in case of a conventional EDGE transmitter device without the suggested spectral filters 72, 74 or 70. Compared to the upper ideal EDGE spectrum, only 4 dB margin remains at the 400 kHz corner.

Figure 8:
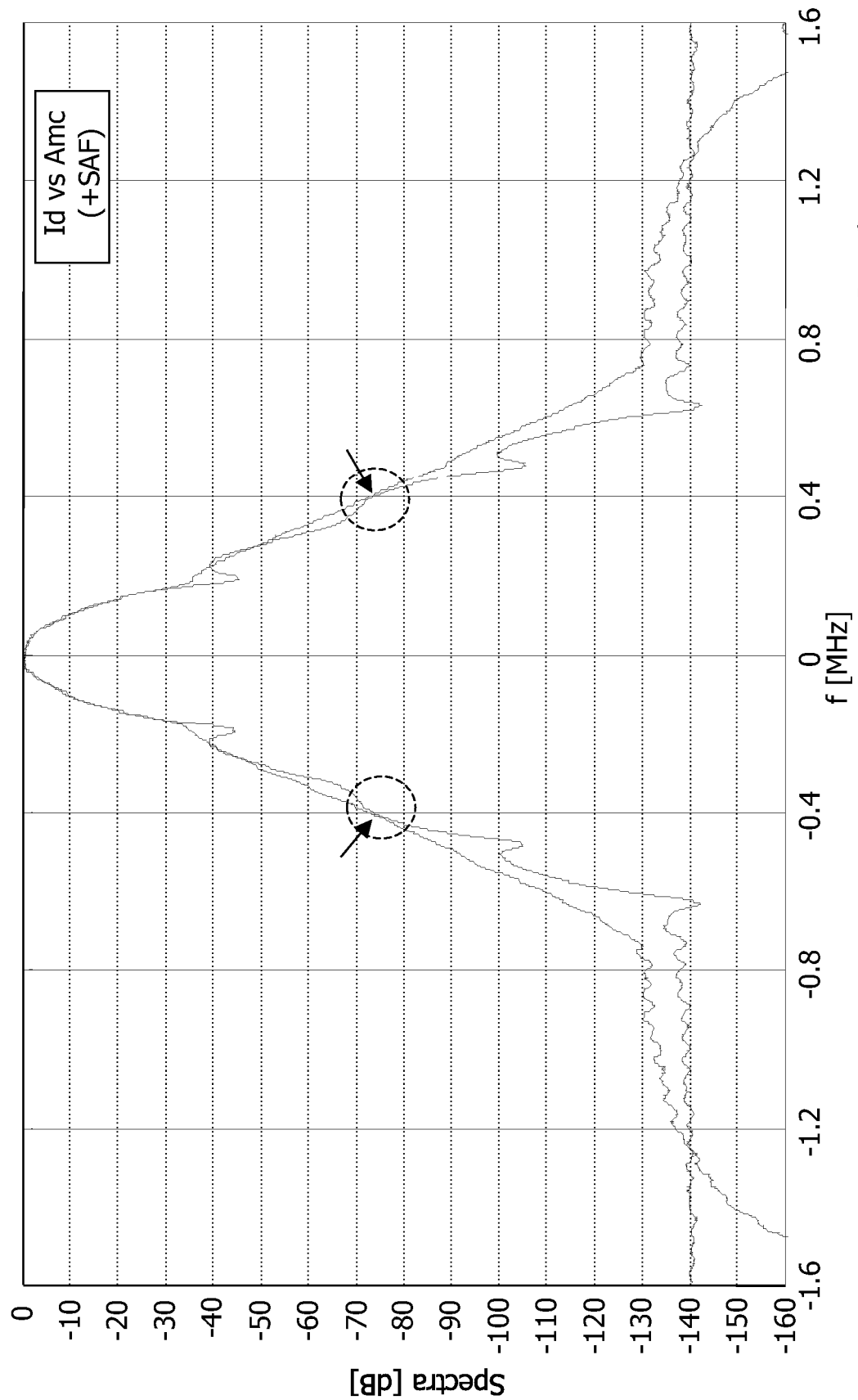
FIG. 8 show a diagram indicating EDGE transmission spectra of different cases relating to the second preferred embodiment.

FIG. 8 shows a diagram indicating transmission spectra of the above different cases relating to the second preferred embodiment. Again above AM compression is applied, but now the above improving spectral filters 72, 74 or 70 are inserted. Here, the margin at the 400 kHz corner is 16 dB now. Thus, the filter has created robustness against AM compression.

Ideal and real modulation pointers differ by the Error Vector Magnitude (EVM in %). The below table shows such simulated EVM results. For these simulations the EVM in not filtered like in analyzers for EDGE type approval.

Simulated EVM results for EDGE.

|  | Average EVM | Peak EVM |
| --- | --- | --- |
| Case of FIG. 7 with AM compression No improving additional base-band filter | 8.77% | 19.44% |
| Case of FIG. 8 with AM compression but with the improving additional base-band filters | 7.55% | 17.9% |

The EVM values are already rather bad due to the chosen AM compression curve. However, the additional spectral filters 72, 74 or 70, which in principal operate against the rules, do not increase the large errors.

It can thus be concluded that a possibility for improving the frequency exploitation in a GSM system has been found. Advantageously, nothing must be changed in the specified standards of mobile communication systems. The additional spectral filter(s) $F(j\omega)$, e.g. as depicted in FIGS. 3(a) and 3(b), for the base-band signal improve the transmission spectra so much that the systems take a strong advantage in terms of use of the frequency bands. The disadvantage of this filtering is an RMS phase error of 1.72° and 0.22 dB AM. There are however still enough margins to the required limits specified in the specifications for the systems US850 GSM900, DCS1800 and PCS1900. The AM can be completely cancelled by the PA 60 in some cases. In spite of such possible AM limitations there is a lot of power reduction above 200 kHz separation from carrier frequency.

The proposed spectral filter(s) improve the EDGE spectra but create modulation errors in such a manner that there is still enough EVM margin for the type approval tests. This is no disadvantage because the overall EVM for bad cases drops if the filter is applied. The PA design for enough margins at the 400 kHz corner will thus be easier if the additional spectral filter(s) are used. For the case of a linear PA 60 there is about 25 dB margin at the 400 kHz corner.

The fundamental pulse-shaping by the single spectral filter 36, 38 or 70 of FIG. 2 for the fundamental pulse C0 defined in specification 3GPP TS 45.005 V7.0.0 (2005-04) can be based on Peter Jung, "Laurent's Representation of Binary Digital Continuous Phase Modulated Signals with Modulation Index 1/2 Revisited", IEEE Transactions on Communications (ISSN 0090-6778), vol. 42, no. 2-4, pt. 1, p. 221-224, 02/1994. There, a special method for creating GMSK is described, where also the same fundamental pulse C0 of the EDGE standard is used. The additional filter 72, 74 creates a new pulse shaping by convolution with C0. The filter of FIGS. 3a and 3b makes the mathematical function of a discrete convolution visible by means of shown block diagrams of hardware devices.

It is noted that the present invention is not restricted to the specific filter characteristic described above. In general, for an optimized system all unwanted Tx spectra beyond 110 kHz could be more attenuated in front of a nonlinear PA. Then the PA does not create powerful multi-mixing products at around the critical 400 kHz corner or any other critical region of other transmission systems. By filtering at base-band (e.g. I and Q components) the GMSK system is modified a little in a direction of QPSK in that manner that it is no longer an ideal FM modulation system. Thus, the spectrum is more selective.

Most of all GSM Receivers receive GMSK as a kind of QPSK. The smart TX modification causes an additional advantage at S/N.

In a system that uses I- and Q-paths for GMSK and for EDGE it is the easiest way to implement the proposed filter in the digital domain in front of the DACs. For the receivers there is only a marginal difference, because the filter bandwidth of receivers is rather small anyhow.

It is intended to violate the specified rules for creating the TX signals a little, but in a smart manner, so that the caused deviations only take a small part of the specified error tolerances.

In summary, transmitter devices and transmission methods of transmitting a modulated radio signal, e.g. GMSK- or EDGE-signal, in a transmission system, wherein normally the pulse shaping follows the given rules of standards for these mobile radio systems. The amount of TX spectra in the adjacent TX channels is predetermined by these rules. A second filtering step is suggested to be introduced for attenuating predetermined unwanted spectra in the adjacent transmit channels. A second goal and realized effect of this suggestion is to reduce spectra at adjacent TX channels also at cases of nonlinearity at the TX Power Amplifier of the RF transmitter. Thereby, a possibility for improving frequency exploitation in a GSM- and EDGE system has been found. Advantageously, nothing must be changed in the specified standards of mobile communication systems. transmitters for GMSK and EDGE are optimized by means of filtering for an other goal than that one that is specified in the GSM/EDGE recommendations.

Finally but yet importantly, it is noted that the term "comprises" or "comprising" when used in the specification including the claims is intended to specify the presence of stated features, means, steps or components, but does not exclude the presence or addition of one or more other features, means, steps, components or group thereof. Further, the word "a" or "an" preceding an element in a claim does not exclude the presence of a plurality of such elements. Moreover, any reference sign does not limit the scope of the claims.

The invention claimed is:

1. A transmitter device for transmitting a radio signal via a transmission channel of a radio system, said device comprising:
   a first spectral filter configured to improve said radio system with respect to undesirable transmission power density occurring in a neighboring transmission channel, wherein:
      said first spectral filter is configured to low-pass filter said radio signal; and
      said first spectral filter includes a finite impulse response filter having a predetermined sampling time which is smaller than a step period of primary transmission symbols and having a number of filter coefficients comprising data for a discrete convolution in the time domain, the filter coefficients including odd-numbered filter coefficients set to a first value and even-numbered filter coefficients set to a second value opposite to the first value.

2. A transmitter device according to claim 1, wherein said radio system is an Enhanced Data rates for GSM Evolution (EDGE) system.

3. A transmitter device according to claim 1, further comprising a suboptimal final transmission stage.

4. A transmitter device according to claim 3, wherein said device comprises pre-compensation means for only partially compensating non-linear effects of said final transmission stage.

5. A transmitter device according to claim 4, further comprising circuit elements for transmission via another radio system and arranged for low-pass filtering Cartesian components of a modulation pointer of a radio signal of said other radio system to improve a transmission spectrum of a final transmission stage even if said final transmission stage deletes all amplitude modulations.

6. A transmitter device according to claim 5, wherein said other radio system is a Gaussian Minimum Shift Keying (GMSK) system.

7. A transmitter device according to claim 1, wherein said spectral filter is configured to use said discrete convolution for pulse shaping and replace provision of a fundamental pulse.

8. A transmitter device according to claim 1, wherein said first spectral filter is arranged in an in-phase path, the transmitter device further comprising a second spectral filter arranged in a quadrature-phase path and having filter parameters and a predetermined sampling time which is smaller than the step period of the primary transmission symbols.

9. A transmitter device according to claim 1, wherein the first value is "1" and the second value is "4", wherein said sampling time is set to one twelfth of said step period, and wherein said step period is set to 48/(13 MHz).

10. A transmitter device according to claim 1, further comprising:
   a digital-to-analog converter coupled to an output of the first spectral filter; and
   an analog filter coupled to an output of the digital-to-analog converter, wherein said first spectral filter is configured to pre-compensate the analog filter by inverse convolution.

11. A transmitter device according to claim 1, wherein said filter coefficients of said first spectral filter are variable to enable adjustment of a notch frequency of said first spectral filter.

12. A mobile terminal comprising a transmitter device according to claim 1.

13. A method for use with a transmission channel of a radio system, said method comprising:
   pulse shape filtering a radio signal, the pulse shape filtering including generating unwanted signal portions;
   suppressing the unwanted signal portion by low-pass filtering said radio signal using a spectral filter configured to improve said radio system with respect to undesirable transmission power density occurring in a neighboring transmission channel, the low-pass filtering having a predetermined sampling time which is smaller than a step period of primary transmission symbols and having a number of filter coefficients comprising data for a discrete convolution in the time domain, the filter coefficients including odd-numbered filter coefficients set to a first value and even-numbered filter coefficients set to a second value opposite to the first value; and
   transmitting the radio signal on the transmission channel of the radio system.

14. A method according to claim 13, further comprising:
   digital-to-analog converting the radio signal after low-pass filtering the radio signal; and
   analog filtering the radio signal prior to transmitting the radio signal, wherein said low-pass filtering includes pre-compensating the analog filtering by inverse convolution.

15. A transmitter device for transmitting a radio signal via a transmission channel of a radio system, said device comprising:

a first spectral filter configured to improve said radio system with respect to undesirable transmission power density occurring in a neighboring transmission channel, wherein said first spectral filter is configured to low-pass filter said radio signal and said first spectral filter is a finite impulse response filter having a predetermined sampling time which is smaller than a step period of primary transmission symbols and having a number of filter coefficients comprising data for a discrete convolution in the time domain, the filter coefficients including odd-numbered filter coefficients set to a first value and even-numbered filter coefficients set to a second value opposite to the first value;

a digital-to-analog converter coupled to an output of the first spectral filter; and an analog filter coupled to an output of the digital-to-analog converter, wherein said first spectral filter is configured to pre-compensate the analog filter by inverse convolution.

16. A transmitter device according to claim 15, further comprising:
   a suboptimal final transmission stage; and
   pre-compensation means for only partially compensating non-linear effects of said final transmission stage.

17. A transmitter device according to claim 15, further comprising circuit elements for transmission via another radio system and arranged for low-pass filtering Cartesian components of a modulation pointer of a radio signal of said other radio system to improve a transmission spectrum of a final transmission stage even if said final transmission stage deletes all amplitude modulations.

18. A transmitter device according to claim 17, wherein said first spectral filter is arranged in an in-phase path, the transmitter device further comprising a second spectral filter arranged in a quadrature-phase path and having filter parameters and a predetermined sampling time which is smaller than the step period of the primary transmission symbols.

* * * * *

UNITED STATES PATENT AND TRADEMARK OFFICE
CERTIFICATE OF CORRECTION

PATENT NO.        : 8,279,970 B2                                Page 1 of 1
APPLICATION NO.   : 12/097100
DATED             : October 2, 2012
INVENTOR(S)       : Winfrid Birth It is certified that error appears in the above-identified patent and that said Letters Patent is hereby corrected as shown below:

Col. 10, line 23
Claim 9, line 2, please change "4" to -- -1 --.

Signed and Sealed this
Nineteenth Day of March, 2013

Teresa Stanek Rea
*Acting Director of the United States Patent and Trademark Office*